United States Patent [19]
Moore

[11] 3,962,850
[45] June 15, 1976

[54] METHOD AND APPARATUS FOR HARVESTING TOBACCO

[76] Inventor: Bobby G. Moore, Rte. 4, Conway, S.C. 29526

[22] Filed: Aug. 1, 1974

[21] Appl. No.: 493,866

[52] U.S. Cl. ................................................ 56/27.5
[51] Int. Cl.² ........................................ A01D 45/16
[58] Field of Search .................. 56/27.5, 10.1, 11.9, 56/14.7, 15.5

[56] References Cited
UNITED STATES PATENTS

| | | |
|---|---|---|
| 2,876,610 | 3/1959 | West et al. ............................ 56/27.5 |
| 3,603,064 | 9/1971 | Pinkham ............................... 56/27.5 |
| 3,872,655 | 3/1975 | Davis, Sr. ............................. 56/27.5 |

Primary Examiner—Russell R. Kinsey
Attorney, Agent, or Firm—Burns, Doane, Swecker & Mathis

[57] ABSTRACT

A tractor drawn mechanical tobacco harvester in which the defoliating apparatus is pivotable as a unit to accommodate changes in terrain and variations in the alignment of the tobacco plants within the row of plants being harvested. The defoliating apparatus is selectively positionable to defoliate different rows of tobacco plants without a change in the position of the tractor. A novel defoliating apparatus is also disclosed.

14 Claims, 7 Drawing Figures

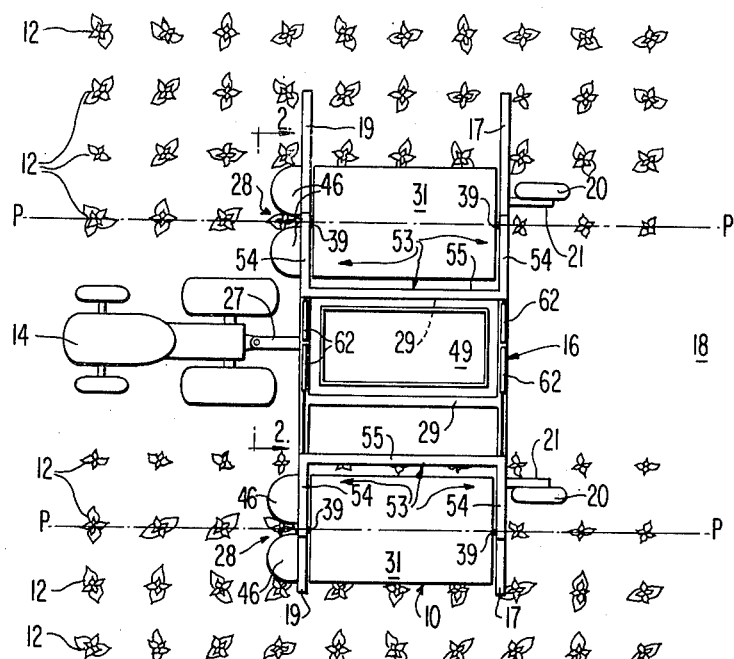
FIG.1
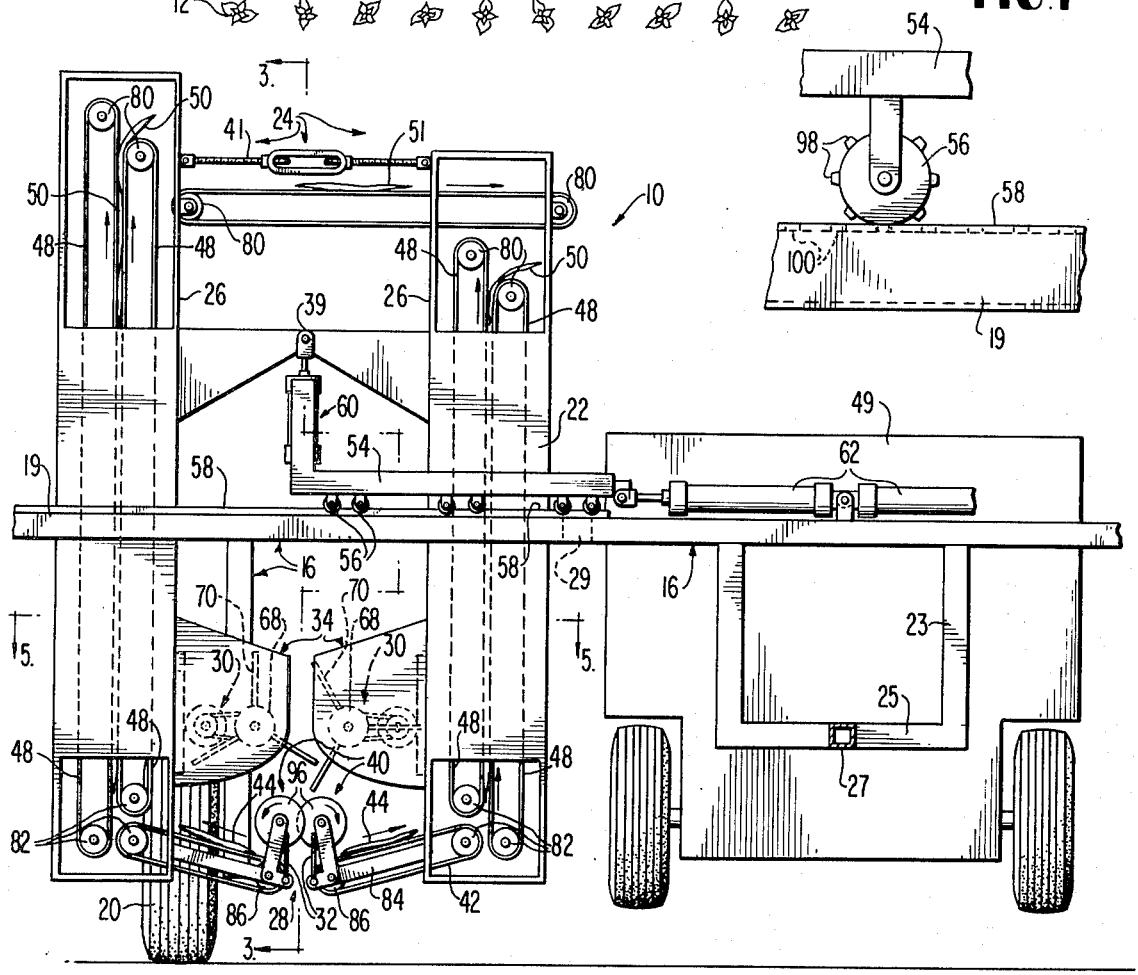
FIG.7
FIG.2

METHOD AND APPARATUS FOR HARVESTING TOBACCO

BACKGROUND OF THE INVENTION

The present invention relates to tobacco harvesters and more particularly to a method and apparatus for automatically defoliating a selected vertical portion of an individual tobacco plant.

Tobacco of the bright leaf or flu-cured type grows to a height of 6 feet or more in the form of a single vertical stalk having numerous leaves extending upwardly and outwardly. The leaves grow from the stalk at an angle of approximately 50° from the horizontal and droop somewhat under their own weight. The tobacco leaves are spaced spirally on the stalk throughout 360° and ripen progressively from the bottom to the top of the stalk over period of 6 to 8 weeks. The leaves are desirably harvested only at a particular stage in the ripening process. This desideratum is achieved only by a number of separate harvesting operations.

In the hand "cropping" or harvesting of tobacco, the uppermost leaf adjudged by its color to be ripe for harvesting is grasped with the hand. That lead, and subsequently, the leaves lower down the stalk are snapped therefrom by a sharp, downward movement of the hand. The work is extremely hot, dusty, and gummy from the bleeding of the leaves.

While the steps of transplanting, cultivating, topping, and suckering tobacco plants have been mechanized to reduce the labor requirements, attempts to mechanize the harvesting or defoliating process have been generally unsatisfactory. Farm labor is today difficult to obtain. Thus the cost of the labor necessary to pass through a field four, six, or more different times, removing only ripened leaves from the stalk, constitutes a disproportionately large part of the total cost of raising tobacco.

It is accordingly an object of the present invention to provide a novel method and apparatus for the mechanized defoliation of a selected vertical section of a tobacco plant.

Many attempts to mechanize the harvesting of tobacco have been made. Among these is the harvester disclosed in the Pickett et al U.S. Pat. No. 3,507,103. In this case the defoliating apparatus of a self-propelled harvester is suspended by flexible cables from a wheeled carrier to provide for movement of the defoliating apparatus. Such suspension systems are advantageous in that the defoliating apparatus will assume a vertical orientation under the influence of gravity thereby increasing compatibility with the vertical stalks of the tobacco plants irrespective of terrain contour.

Because the defoliating apparatus must pass on opposite lateral sides of the tobacco plant to accomplish the cropping of leaves therefrom, the defoliating apparatus is longitudinally divided into two units. Suspension systems such as that disclosed in the Pickett et al patent effect independent suspension of these two lateral units. Misalignment of the two units relative to one or more plants is thus possible. The pressure of a stalk laterally against one of these units may effect lateral movement thereof while the other unit retains its vertical orientation due to gravity. Such relative movement tends to create an undesirably large space between the two units.

Therefore, still another object of the present invention is to provide a mechanical tobacco harvester in which the defoliating apparatus is laterally movable as a unit in response to the lateral pressure of tobacco plants passing therethrough.

Weather is also a continuing problem in that the tobacco plants are occassionally blown or beaten into positions far from the normal vertical position by wind, hail or the like. The mechanical defoliation of plants in this circumstance is generally impossible.

It is still a further object of the present invention to provide a mechanical defoliator with the capacity to straighten up wind blown plants in the defoliation thereof. To this end the pivotal suspension and stalk gripping character of the defoliating apparatus is quite useful.

It is customary in the mechanized planting of tobacco to plant four rows at a time spaced sufficiently to permit the movement of a tractor between adjacent four row plantings. Due to the lateral proximity of the four rows and the size of the individual tobacco plants, it is desirable that the wheeled vehicle traffic between the four rows be minimized.

Thus, yet another object of the present invention is to provide a novel tobacco harvester which may be drawn by a tractor passing along the area between adjacent four row plantings and in which only a single small, non-driven wheel need pass between any of the four rows of tobacco plants.

Still a further object of the present invention is to provide a mechanical tobacco harvester in which a defoliating unit is selectively positionable to harvest the outside or second row of the four rows in a planting, without the necessity for altering the wheel between the rows of the four row planting.

These and many other objects and advantages of the present invention will be readily apparent from the claims and from the following detailed description when read in conjunction with the appended drawings.

THE DRAWINGS

FIG. 1 is a plan view of one embodiment of the present invention illustrating the relationship between the harvester and spaced four row plantings;

FIG. 2 is an enlarged transverse section in elevation taken through lines 2—2 of FIG. 1;

FIG. 3 is a longitudinal section in elevation taken through lines 3—3 of FIG. 2;

FIG. 6 is a longitudinal section in elevation taken through lines 6—6 of FIG. 4; and FIG. 7 is a partial lateral view in elevation of an alternative embodiment of the harvester unit positioning apparatus illustrated in FIGS. 2 and 4.

DETAILED DESCRIPTION

A. General Discussion

Figure 5:
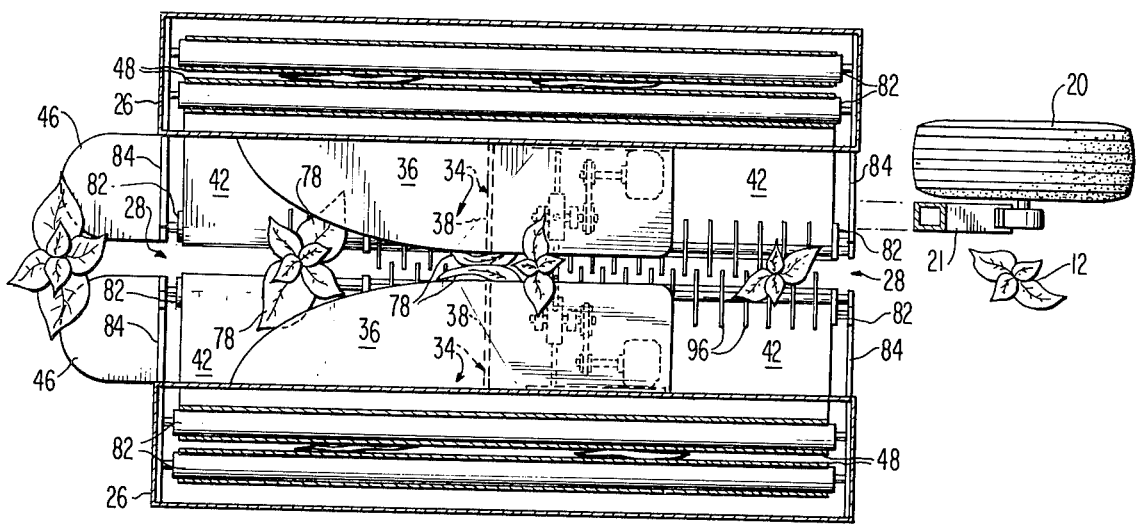
FIG. 5 is a horizontal section view in elevation taken through lines 5—5 of FIG. 2.

This invention relates generally to a mechanical tobacco harvester. More particularly, this invention relates to a tractor drawn mechanical tobacco harvester which can be laterally and vertically positioned with respect to the tractor to sequentially defoliate adjacent rows and selected vertical zones of tobacco plants.

Referring now to FIG. 1, a generalized plan view can be seen of the tobacco harvester 10. The harvester is drawn along parallel rows 12 of tobacco plants by a tractor 14. The tobacco harvester 10 includes a carrier or first, laterally stationary frame 16 which is in rolling contact with the ground 18 through wheels 20. As can be seen from an examination of FIG. 2, the carrier 16 carries at least one second frame or harvesting unit 22 laterally positionable relative thereto. This second frame 22 in turn carries a third frame or defoliating unit 24 comprised of laterally spaced first and second panel members 26 which face opposite sides of a row of tobacco plants. The panel members thus form an elongated passage 28 through which the plants pass as the tractor 14 draws the harvester 10 between the rows 12.

It should be appreciated from an examination of FIG. 1 that the first frame 16 preferably carries two harvesting units 22 (see FIG. 2) which doubles the harvesting capacity of the harvester. The harvesting units 22 may be mirror images of one another and, in the interest of simplicity, only one of the units will be hereinafter described.

Figures 3, 6:
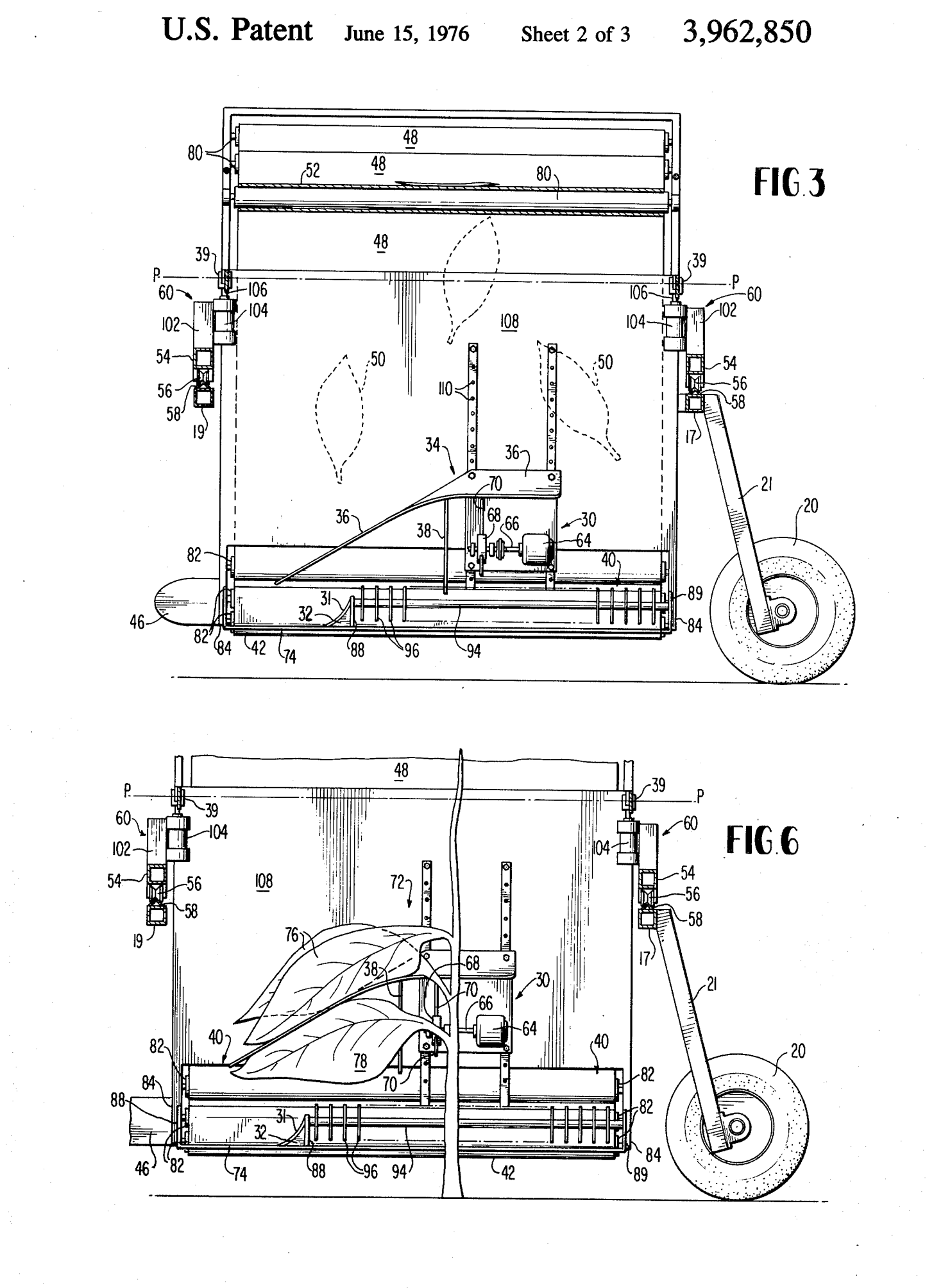

With continued reference to FIG. 2, each of the harvesting units 22 includes a pair of defoliating units 30 for severing the leaves from the stalks of the tobacco plants. The leaves, as opposed to the stems, of a tobacco plant are protected from damage by the defoliating units 30 by leaf deflectors 34. As can perhaps be most clearly seen from FIGS. 3 and 6, the leaf deflectors 34 are each comprised of an arcuate, forwardly and downwardly extending leaf-lifting shield 36 which slips beneath and lifts leaves sagging in the path of the defoliator 30 so that only the stems of the leaves are exposed to the defoliators. Connected to each shield 36 is a planar leaf deflector 38 which serves to deflect leaves which have slipped beneath the shield 36 and which are disposed in the path of the defoliator 30. Thus only the stems of these leaves are exposed to the defoliator 30.

With reference again to FIG. 2, the panel members 26 are pivotably interconnected at upper portions thereof by connections 39 which also serve to pivotally support the panel members relative to the first frame 16. One of the pivotable connections 39 is disposed at the front and the other is disposed at the rear end of the panel members (see FIGS. 3 and 6). The panel members 26 are also interconnected by an adjusting member 41 which preferably takes the form of a turnbuckle. By virtue of the interconnection of the panel members 26 by the turnbuckle 41 and the pivotable connections 39, the panel members are rigidly connected and thus pivot as a single unit.

Referring now to FIGS. 2, 3, 4, and 6, shunts 40 and first lateral conveyors 42 are connected in any conventional manner to lower portions of the panel members 26. Portions of the shunts and conveyors define the elongated passage 28. Also connected to lower portions of the panel members 26 forwardly of the shunts 40 and conveyors 42 are plant channeling nose pieces 46 which serve to channel plants into the elongated passage 28 as the harvester moves along a row of tobacco plants. By viture of the rigid interconnection and the pivotal support of the panel members 26, the entire assembly; including the panel members, nose pieces 46, shunts 40, conveyors 42, and defoliators 30, is free to pivot as a single unit about a generally horizontal axis P-P extending through the pivotable connections 39 in a direction generally parallel to the rows of tobacco plants.

The pivoting of the panel members takes place in response to contact between individual plants and the channeling members 46 and the boundaries of the elongated passage 28. This pivotability permits automatic lateral adjustment of the defoliating unit to maintain a proper defoliating relation between both of the defoliators 30 and the tobacco plants passing through the elongated passage 28.

Leaves removed from a tobacco plant by the harvester are conveyed laterally away from a row by the shunts 40 and lateral conveyors 42 to vertical conveyors 48 between which the leaves 50 are sandwiched. The leaves are then vertically conveyed to a second lateral conveyor 52 or, depending upon the position of the harvester, to a removable conveyor 90 which ultimately conveys the leaves to a remote storage location.

The defoliating unit 24, including the panel members 26 is positioned relative to the carrier 16 by a yoke, roller, and track arrangement in conjunction with a fluid pressure operable piston and cylinder arrangement. As can be seen from an examination of FIG. 1, the yoke is located generally at 53 and is comprised of parallel arms 54 interconnected by an elongated member 55.

As can be seen from FIG. 2, the arms 54 of the yoke are carried by rollers 56 which roll along a track 58. At the free end of each arm 54 are fluid pressure operable piston and cylinder arrangements 60 which are connected to the panel members through the pivotable connections 39. Interconnecting the first frame 16 and the end of each arm 54 opposite the piston and cylinder arrangement 60 is a second fluid pressure operable piston and cylinder 62 which functions to displace the rollers 56 and the track 58 relative to one another. By virtue of the piston and cylinder 62 and the rolling relation between the rollers 56 and the track 58, the yoke can be moved laterally away from one row of tobacco plants to selectively position the defoliating unit at another row of tobacco without repositioning the first frame 16.

As mentioned earlier, the panel members 26 of the defoliating unit 24 are connected to the arms 54 of the yoke through the piston and cylinder arrangements 60. Upon activation of the piston and cylinder arrangements 60, the defoliating unit 24 can be vertically positioned to selectively position the defoliators 30 relative to selected vertical zones of the tobacco plants.

B. The Supportive Framing System

The mechanical tobacco harvester shown generally at 10 in FIG. 1 is structurally supported by a carrier which includes a first frame 16. The first frame is preferably a symmetrical arrangement which includes a transverse rear strut 17 and a similar forward strut 19. These struts preferably symmetrically carry two harvesting units or second frames each including a yoke located generally at 53 and an associated defoliating unit or third frame 24. The supportive relation between the carrier and the defoliating unit can perhaps be more clearly seen in FIG. 2. Symmetrically connected to the rear strut 17 are vertical wheel columns 21 and connected to the lower end of each of the the wheel columns 21 is a wheel 20 in rolling contact with the ground 18.

The rear and forward struts 17 and 19, respectively, are symmetrically interconnected by elongated framing members 29. Because of the position of the third frames, only one of the framing members can be seen in FIG. 1, the other being hidden by a portion of the yoke 53. As can be seen from FIG. 2, connected to a central section of the forward strut 19, are two hitch columns 23. The hitch columns 23 are interconnected at their lowermost ends by a transverse member 25 to which is connected a suitable draw bar and tractor hitch assembly 27 which can be seen schematically in FIG. 1.

Each harvesting unit includes panel members 26 and a supportive yoke 53 comprised of parallel arms 54 interconnected by an elongated member 55. The yoke 53 is in turn supported by the carrier 16. The panel members 26 together comprise a defoliating unit which serves to support the plant defoliating and guiding systems as well as the leaf protecting and conveying systems to be hereinafter discussed.

C. The Defoliating System

Referring now to the longitudinal section of FIG. 3, the defoliating system includes a defoliator 30 connected to a lower portion of the interior of each panel member 26. Each defoliator 30 is comprised of a suitable motor 64 which drives a spindle 66 passing through and connected to a generally planar disc 68. From each disc 68 radiates a plurality of elongated flexible members 70 which together constitute a flail. The circular character of the disc 68 and the manner in which the elongated members 70 radiate therefrom can also be clearly seen in FIG. 2. The motor 64 can be of any suitable type and can either operative independently or in connection with the power takeoff of the tractor 14 illustrated in FIG. 1. The elongated flexible members 70 similarly can be composed of any suitable material having the requisite flexibility and strength. The length of the flexible member may be selectively varied as a function of the height of the stalk at which defoliation occurs. For example, the length of the members may be much shorter for harvesting the lowermost leaves.

The function of the defoliating units can perhaps best be understood from an examination of FIG. 6 which is a cross-sectional view of a portion of the tobacco harvester in position to defoliate a tobacco plant 72. For purposes of illustration, only a few leaves are shown growing from the stalk of the plant.

As the harvester is drawn along a row of tobacco plants, the plants will successively assume the position shown in FIG. 6 so that they can be at least partially defoliated seriatum. Rotation of the disc 68 and associated flails 70 radiating therefrom causes the flails to impact the stalk and the stems of leaves growing from the stalk of the tobacco plant above ground in a limited vertical zone. As shown in FIG. 2, the elongated members 70 overlap somewhat when horizontally and inwardly oriented so that the stalk and the stems of all leaves growing from all sides of the stalk within the limited vertical zone thereof may be impacted. The stems are broken or stripped from the stalk as a result of the impacting of the elongated members and the limited vertical zone of the plant thereby defoliated.

The lowermost leaves, commonly referred to as lugs, may grow from the stalks of the tobacco plant at elevations too low for the defoliators to reach. These leaves may be removed by the defoliating blades 32 shown in FIG. 3. Supporting each blade is an elongated blade support 74 which extends along each lateral boundary of the elongated passage 28. As tobacco plants pass successively through the elongated passage 28, leaves growing from the very low portions of the stalks of the plants can be severed from the stalk by the blades 32. Once severed, the leaves will come to rest on the conveyors 42 so that they may be conveyed laterally away from the row of tobacco plants. The blades 32 may be triangular and the cutting edges 31 thereof extend forwardly and downwardly from flanges 88 which are also connected to the blade supports. This configuration of the blades allows them to slip under and progressively sever a stem of a tobacco plant leaf in an upward direction. The blades are desirably leveled upwardly and inwardly so that the cutting edge is formed on the side of the blade nearest the stalk.

D. The Leaf Protecting System

It can be readily appreciated that the leaves, as opposed to the stems of the leaves, must be protected from damaging impacting by the elongated members 70 of the defoliators 30. To this end, leaf deflectors 34 are connected to the panel members and partially enclose each defoliator in a manner which serves to expose only the stems of the leaves to the defoliators. As can be seen from an examination of FIGS. 2 through 5, the leaf deflectors are each comprised of an arcuate forwardly and downwardly extending shield 36. The shields 36 are intended to slip under and uplift leaves sagging in the path of the defoliators to protect the leaves from damaging contact with the elongated members 70 of the defoliators.

An examination of FIGS. 5 and 6 will reveal that as the harvester moves along a row of tobacco plants and the plants pass through the elongated passage 28, the arcuate shields 36 should slip under and uplift leaves such as those located at 76. Though not growing from the stalk directly in the path of the defoliators, nonetheless these leaves sag downwardly so that they would be destroyed by the defoliators were it not for the uplifting function of the shield 36. The uplifting function of the shields lifts up the leaves in such a manner that only the stems of leaves growing from the limited vertical zone of the plant to be defoliated are exposed to the defoliators. If, for instance, one of the leaves lifted by the shields 36 grows from a portion of the stalk exposed to the defoliator, as does the middle of the three leaves illustrated in FIG. 6, the elongated flexible members of the defoliators impact the stem and separate the leaf from the stalk of the tobacco plant without contacting the leaf. Once the leaf is removed from the tobacco plant, it is either brushed over the shield 36 onto the conveyor 42 by leaves which remain attached to the stalk or it slips downwardly toward the front of the harvester onto the conveyor 42 to be conveyed laterally away from the row of tobacco.

Other leaves may grow from the stalks of tobacco plants in the path of the defoliators in such a way that the shields 36 may not lift the leaves out of the path of the defoliators. In this case, planar leaf deflectors 38, located beneath the shields 36, permit exposure of the stems of such leaves to the defoliators while concurrently protecting the leaves from contact therewith.

As can be seen from an examination of FIGS. 5 and 6, leaves such as those indicated at 78, which grow from the tobacco stalks in the path of the defoliator may often slip beneath the shields 36. As the stalk and defoliators reach the relative position illustrated in FIG. 6, the leaf 78 is turned aside by the deflectors 38 to expose only the stem thereof to the impacts of the elongated flexible members 70. The leaf is thereby removed from the stalk of the tobacco plant as described earlier. Once removed, the leaf drops downwardly into contact with either or both of the shunts 40 and is shunted onto either of the conveyors 42 to be conveyed laterally away from the row of tobacco plants.

E. The Plant Guiding and Harvester Adjusting System

In order for the defoliators 30 to properly remove leaves from the stalks of the tobacco plants, and in order for the leaf deflectors 34 to properly protect the leaves while exposing the stems of the leaves to the defoliators, the tobacco plants should pass through the elongated passage 28 in a manner which will assure that the plants and the defoliating unit 24 are properly positioned relative to one another. In the course of a planting operation the tobacco plants may not be planted in a perfectly straight line. There may be occasional "stray" plants slightly out of the line of the row. Other plants, while they may be growing from the ground directly in the line of the row, may not grow in a parallel relation to other plants of the row and upper portions thereof may be out of alignment with the upper portions of other plants of the row. A further problem resides is the difficulty which may confront the operator of the harvester in advancing the harvester down a row in alignment therewith. The movement of the harvester will very likely vary relative to the row of tobacco plants despite the best efforts of an operator. The existence of stray plants and human error of the character just described may thus tend to disrupt the relationship needed between the plants and the defoliators for satisfactory defoliation.

Another problem exists where the terrain is sloping and some difficulty can be experienced in the initial spatial adjustment of the defoliator to the plants. Still another problem exists where the normal orientation of the plants relative to the vertical has been disturbed by wind, hail or the like, so that the plants must be lifted for proper operation of the harvesting apparatus.

In order to minimize variations in the relationship between plants passing through the harvester and the defoliators, the panel members 26 are pivotally interconnected as shown in FIG. 3 at the pivotable connections 39 and are also pivotally supported at these points by the yoke 53 through the piston and cylinder arrangements 60. A turnbuckle 41 also interconnects the panel members so that the entire defoliating unit 24 is rotatable as a single unit about the longitudinal axis P-P extending through the pivotable connections 39 to afford adjustment of the relationship between the plants and the defoliators.

As seen in FIGS. 1 and 5, channeling members 46 are connected to lower front portions of the panel members and serve to channel plants into the defoliating unit. The defoliating unit rotates initially in response to contact between the channeling members 46 and stalks of individual tobacco plants. Thus, if one plant is out of alignment with the remaining plants of the row, it contacts one of the channeling members and tends to pivot the third frame about the axis P-P as the plant is channeled into the elongated passage 28. Once within the elongated passage 28, contact between a plant and the boundaries of the passage continues to maintain the desired relationship between the tobacco plants and the defoliators. It will be appreciated that more than one tobacco plant may pass through the elongated passage at the same time. If one of the plants is out of alignment with a remaining plant or plants, then the one plant tends to rotate the third one way while the remaining plant or plants tend to rotate the third frame the other way. These conflicting tendencies of the third frame to rotate result in an averaging in the rotation of the third frame so that an average relationship between each individual plant and the defoliators is established.

It will be understood that the thickness of the stalks of the tobacco plants varies from a relatively thick stalk adjacent the ground to a rather slender stalk some distance above the ground. In order to maintain a proper relationship between the defoliators and various more or less slender portions of the tobacco plant, the width of the elongated passage is adjustable. By adjusting the width of the elongated passage, the boundaries of the passage can be maintained in relatively close proximity to the stalk of the tobacco plants regardless of the thickness thereof.

The adjustment of the width of the elongated passage is accomplished by the turnbuckle 41 which serves to pivot each panel member about the pivotable connections 39 and thus selectively vary the spacing between the panel members. If the length of the turnbuckle is decreased for instance, the width of the elongated passage 28 increases. The relationship between the adjustment of the turnbuckle and the width of the elongated passage depends upon the placement of the turnbuckle relative to the pivotable connections 39. The turnbuckle 41 is desirably located more closely to the pivotable connections 39 than the elongated passage 28. This relation results in an amplification of the effect of dimensional changes in the turnbuckle on the width of the elongated passage.

It is to be understood that the pivoting of the panel members as a unit may be accomplished by means of an appropriately placed hydraulic cylinder or the like and such means may be particularly desirable to effect the initial orientation of the panels with respect to the row.

F. The Leaf Collecting and Conveying System

Once leaves are removed by the defoliating system of the tobacco harvester, they are collected and transported to a remote storage located preparatory to further processing. This collecting and transporting function is served by the leaf collecting and conveying system which, as best illustrated in FIG. 2, includes three elongated rollers 80 rotationally connected to upper portions of each of the panel members 26. Three similar elongated rollers 82 are rotationally connected to lower portions of each of the panel members 26. Also connected to lower portions of the panel members 26 at both forward and rearward ends thereof, are roller supporting arm members 84 which are cantilevered inwardly to rotationally support at the free ends thereof elongated central rollers 86 and shunts 40. The rollers carry conveying belts including two first lateral conveyors 42, two sets of two vertical conveyors 48, and a second lateral conveyor 52.

As suggested in connection with the discussion of the defoliating system and as illustrated in FIG. 3, the arms 84 of each panel which support the inner rollers 86 may also serve to support the elongated blade supports 74 extending therebetween along the elongated passage 28. It should be noted that the blades 32 are disposed on the blade supports 74 some distance back from the forward end of the panel members to allow leaves severed from tobacco plants to fall on one of the first lateral conveyors 42.

The flanges 88, which may be connected to both the blade supports 74 and the blades 32, in conjunction with similar flanges 89 supported by the rear arm 84 of each panel, rotationally support the shunts 40 when the shunts take the form of a plurality of elastomeric discs or a screw as hereinafter discussed. In both cases the shunts extend along at least a portion of either side of the elongated passage 28 and serve to shunt leaves removed by the defoliating system onto one of the first lateral conveyors 42.

Once a leaf is removed from a stalk of tobacco by the defoliating system and shunted onto one of the lateral conveyors, the leaf 44 is conveyed as shown in FIG. 2 laterally to the vertical conveyors and is sandwiched therebetween in the manner shown in FIG. 3.

Once a leaf is sandwiched between the vertical conveyors 48 and is conveyed vertically upward, it may be discharged from between the conveyors onto either the second lateral conveyor 52 or directly into an adjacent suspended wagon 49, depending on which set of vertical conveyors receives the leaf from the first lateral conveyors. The discharge of the leaf onto the second lateral conveyor or directly into the wagon is accomplished by reason of the arrangement of the upstream rollers below the downstream rollers. This configuration permits the leaf which has been lifted vertically to be jettisoned 52 or outwardly into the wagon. If a leaf is discharged onto the second lateral conveying belt 52, it is nonetheless ultimately discharged into the wagon.

Figure 4:
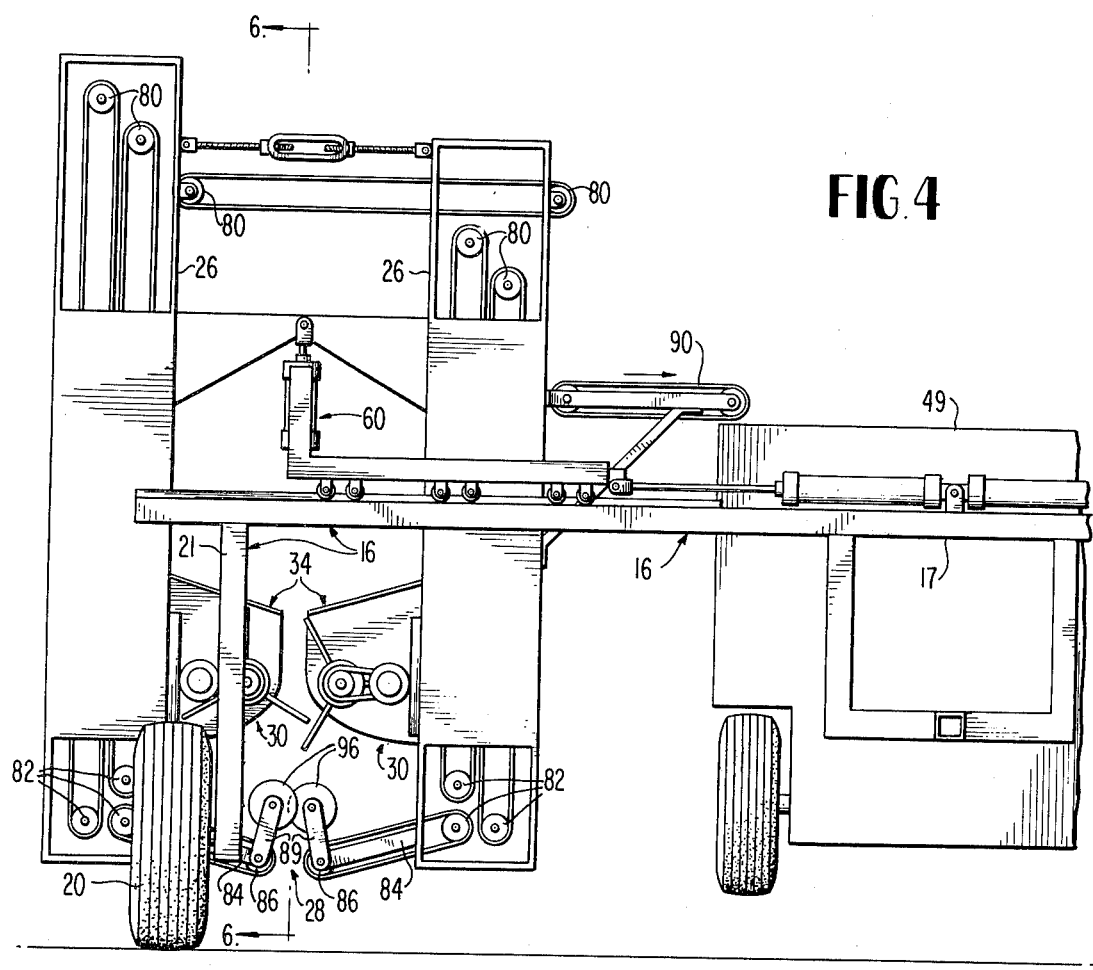
FIG. 4 is a rear view in elevation of an alternative embodiment of the harvester.

If the harvestingg unit 22 should be repositioned as illustrated in FIG. 4 as discussed in the next section, a removable conveyor 90 must be attached to the side of the defoliating unit 24. The removable conveyor can be powered in any desired manner and serves to collect leaves discharged by the vertical conveyors and to convey them into the wagon 49.

The shunts 40 comprise an important aspect of the conveying system. As can be seen from the Figures, and as suggested earlier, these shunts 40 can take two forms. The disc shunt illustrated in FIG. 6 is preferred but an elongated screw may be utilized. Either type of shunt may be rotationally supported by the flanges 88 and 89. The disc shunts are each comprised of an elongated rotatable shaft 94 along which is disposed a plurality of elastomeric discs 96. The discs 96 are desirably disposed along the entire length of each shaft 94, but for simplicity, only those adjacent the flanges 88 and 89 are shown.

The elastomeric discs are of such a size and are spaced along the shaft 94 in such a way that the discs overlap to essentially close the elongated passage 28. This arrangement can perhaps be more clearly understood by referring to FIG. 4 where the overlapping character of the disc shunts can be seen. Because the discs are composed of an elastomeric material, the stalks of each tobacco plant can pass between the shafts 94 despite the overlap of the discs 96 by simply displacing each disc individually from its path.

The direction of rotation of the shunts is desirably reversable so the direction of rotation can be changed for the first priming, i.e., the harvesting of the lowermost leaves, of the plants.

One of the advantages of the present system is that the entire conveying system moves vertically with the panels as well as pivotably therewith in response to either gravity or the application of power as earlier described.

G. The Lateral Positioning System

As indicated earlier, the entire harvesting unit 22 and in particular the defoliators 30 can be moved laterally from a defoliating position relative to one row of tobacco plants to a defoliating position relative to another adjacent row of tobacco plants without repositioning the first frame. As can be seen from an examination of FIG. 1, tobacco plants are commonly planted in groups of four, laterally adjacent rows separated by a relatively wide path through which the tractor 14 can pass. The use of two harvesting units permits one row on either side of the path of the tractor to be harvested in a single pass. A second row on each side may be harvested on a subsequent pass of the tractor along the same path once the harvesting units have been laterally adjusted. In FIG. 1, the right harvesting unit is shown positioned for the defoliation of the plants in the row immediately adjacent the path of the tractor and the other harvesting unit is positioned for the defoliation of the plants of the next adjacent row.

The harvesting units are, as explained earlier, moved laterally between the positions shown in FIG. 1 by fluid pressure operable cylinders 62 which interconnect the carrier and the harvesting units. There are two such piston and cylinder arrangements interconnecting each yoke 53 and the first frame 16. Each piston and cylinder arrangement connects either the rear strut 17 or the forward strut 19 to the yoke 53 and each is in generally axially alignment with an arm 54 of the yoke 53. This arrangement of the piston and cylinder 62 clears the area between the second frames so that tobacco leaves can pass unobstructed into the suspended wagon 49.

Each yoke is supported by the first frame 16 through a suitable roller and track arrangement. As can be seen in FIG. 2, it is preferred that the track 58 extend along each of the forward and rear struts so that the rollers 56 which carry the yoke can ride along the track when the piston and cylinder arrangements are activated to move the yoke.

Referring now to FIG. 3, it can be seen that each of the rollers 56 is connected to an arm 54 of the yoke and rides on one of the tracks 58 disposed on the struts 17 and 19. Each roller is preferably of a V-shaped, peripherally grooved configuration, each track taking the form of a V-shaped ridge which is compatible with and received by the groove of the rollers. The mating V-shaped configuration prevents the yoke from moving in any direction other than along the tracks 58 disposed on the forward and rear struts.

Referring now to FIG. 7, an alternative track and roller arrangement can be seen. For simplicity, only one roller is shown riding along the track of the forward strut 19. In this case, each roller 56 takes the form of a hub which is pivotably connected in any suitable manner to the arm 54 of the yoke. Around the periphery of each roller 56 and rigidly radiating outwardly therefrom is a plurality of spokes 98 which may each be received in one of a plurality of apertures 100 disposed along the track formed by the upper surface of the forward strut 19. Each spoke 98 of each roller is confined by a receiving aperture 100 to prevent any movement of the yoke other than along the struts 17 and 19 as the yoke and associated third frame are displaced by the piston and cylinder arrangements shown in FIGS. 1 and 2.

H. The Vertical Positioning System

In general, not all leaves of a tobacco plant are ripe at the same time. The lowermost leaves tend to ripen first, followed as the season progresses by other leaves located at higher elevations along the stalks of the tobacco plants. It would, therefore, be undesirable to harvest all of the leaves of the tobacco plant at one time since many leaves would either be unripened or overly ripe. It is, therefore, necessary to harvest leaves growing in selected zones above ground along the tobacco stalk at different times beginning with a zone near the base of the stalk and progressing upwardly on successive passes toward the top of the stalk. The progressive defoliation of ever higher zones of the tobacco plant is accomplished by raising the third frame, and in particular the defoliators, to harvest each zone as the leaves therein ripen.

Referring now to FIGS. 2 and 3, it will be seen that the third frame 24, including the panel members 26 and the defoliators are supported relative to the yoke by piston and cylinder arrangements 60. As seen in FIG. 3, each piston and cylinder arrangement 60 is comprised of a cylinder support 102 which is carried by an arm 54 of a yoke. Connected to each cylinder support 102 toward the interior of the yoke is a fluid pressure operable piston and cylinder 104. Extending from the upper end of each piston and cylinder is a piston rod 106 which is pivotably connected to the panel members 26 through the pivotable connections 39. The piston and cylinder arrangement 60 serves in this manner to pivotably support the third frame. By activating each piston and cylinder 104 to control the extension of piston rod 106, the defoliating unit 24 can be vertically moved to position the defoliators 30 relative to selected zones of the tobacco plants.

While the piston and cylinder arrangement 104 may adequately serve to vertically position the defoliating unit, the vertical range of the harvester can be increased by varying the vertical position of the defoliators 30 and the leaf deflectors 34 relative to the third frame. This variation in the vertical position of the defoliators and the leaf deflectors relative to the third frame can be accomplished by virtue of an adjustable connection between the defoliators 30 and the leaf deflectors 34 and each panel member 26.

This adjustable connection is shown in FIG. 3 and may include an apertured wall member 108 extending between forward and rearward ends of each panel member. Threaded fasteners may be passed through selected apertures 110 to connect a defoliator 30 and a leaf deflector 34 thereto.

The vertical position of the defoliators and leaf deflectors can thus be varied in two different ways. The position can be varied by changing the point at which the defoliator and leaf deflector assembly is connected to the wall of a panel member and by varying the degree to which the piston rod extends from the piston and cylinder arrangement supporting the panel members. It will be appreciated that these two approaches to the same problem compliment one another, each extending the vertical range of the other so that essentially all leaves can be removed from the tobacco plant.

I. Other Features of the Invention

Leaves removed from tobacco plants by the tobacco harvester are conveyed away from the row to a remote storage location. The storage location was indicated to be preferably in the form of a wagon 49 disposed between the harvesting units and suspended from the carrier. It should be emphasized that any suitable storage facilty could be employed. It is preferred, however, that the storage facility be centrally located, suspended, and in the form of a wheeled wagon so that it can be disconnected from the carrier and drawn from the field. Several such wagons may be provided so that the tobacco harvester can continue to operate as full wagons are drawn from the field.

It may be that the symmetrical arrangement of dual harvesting units may be unnecessary for some tobacco harvesting operations. If this is the case and only one harvester unit is required, the alternative embodiment illustrated in FIG. 4 can be employed. It should be emphasized that the harvester unit illustrated in FIG. 4 is identical in principle to those illustrated in other figures. The significant difference resides in the structure of the carrier which is configured to carry only one harvesting unit.

I claim:

1. A mechanical tobacco harvester comprising:
   a laterally stationary frame movable in rolling contact with the ground along one of a plurality of laterally spaced rows of tobacco plants;
   first and second panel members;
   support means carried by said frame for supporting said panel members to form therebetween an elongated passage of predetermined width extending in a direction generally parallel to the direction of movement of said frame;
   passage width adjusting means interconnecting said panel members for varying the width of the elongated passage therebetween;
   first and second defoliating means carried respectively by said panel members for at least partially defoliating successive tobacco plants disposed in a defoliating position relative thereto;
   guiding means carried by said panel members for guiding individual tobacco plants into and through the elongated passage in an essentially predetermined spatial relationship with said defoliating means as said frame moves along the row; and,
   first and second conveying means carried respectively by said panel members laterally adjacent the elongated passage for collecting tobacco leaves removed from tobacco plants by said defoliating means and for conveying the collected leaves laterally and vertically away from said defoliating means,
   said support means including pivotable supporting means for pivotably supporting said panel members to thereby permit rotation of said panel members as a unit about a generally horizontal axis generally parallel to the direction of movement of said frame in response to contact between the tobacco plants and said guiding means,
   said support means also including lateral positioning means for positioning said panel members laterally as a unit relative to said frame to thereby selectively position said defoliating means in a defoliating position relative to the tobacco plants of another of the laterally spaced rows of tobacco plants without laterally repositioning said frame relative to the rows of tobacco plants.

2. A mechanical tobacco harvester comprising:
   a carrier movable along one of a plurality of laterally spaced rows of tobacco plants, said carrier including a laterally stationary first frame in rolling contact with the ground and a second frame carried by said first frame;
   defoliating means carried by said second frame for at least partially defoliating successive tobacco plants in a row when said defoliating means is disposed in a defoliating position relative thereto and is moved therealong by said movable carrier; and, lateral positioning means connecting said first frame and said second frame for moving said second frame laterally relative to said first frame to thereby selectively position said defoliating means in a defoliating position relative to the tobacco plants of another of the laterally spaced rows of tobacco plants without laterally repositioning said first frame relative to the rows of tobacco plants.

3. The tobacco harvester of claim 2 wherein said second frame comprises:

a third frame having first and second laterally spaced panel members interconnected at an upper portion thereof and separated at the lowermost portion thereof to thereby form an elongated, relatively narrow passage of predetermined width extending between said panel members in a direction generally parallel to the direction of movement of said carrier;

guiding means carried by said third frame in position to engage the stalks of tobacco plants for positioning said third frame relative to the tobacco plants by guiding the individual tobacco plants into and through the elongated passage in an essentially predetermined spatial relationship with said defoliating means as said carrier moves along the row; and, conveying means carried by said third frame laterally adjacent the elongated passage for collecting tobacco leaves removed from tobacco plants by said defoliating means and for conveying the collected leaves laterally and vertically away from said defoliating means.

4. The tobacco harvester of claim 3 wherein said second frame further comprises vertical positioning means for selectively vertically positioning said defoliating means relative to said second frame to thereby selectively position said defoliating means relative to a selected vertical zone of the tobacco plants above the ground, said vertical positioning means including pivotable supporting means for pivotably supporting said panel members to thereby permit rotation of said third frame as a unit about a generally horizontal axis generally parallel to the direction of movement of said carrier in response to pressural contact between the tobacco plants and said guiding means.

5. The tobacco harvester of claim 4 including adjusting means for selectively modifying the lateral spacing between said panel members, said adjusting means being nearer to said pivotable supporting means than the lowermost end of said panel members.

6. The tobacco harvester of claim 5 wherein said lateral positioning means comprises:

a plurality of rolling elements disposed between said first frame and said second frame;

at least one track connected to one of said first and second frames and cooperating with said rolling elements; and, displacing means for displacing said track and said rolling elements relative to one another to thereby laterally position said second frame relative to said first frame.

7. The tobacco harvester of claim 6 wherein said second frame further comprises a yoke having parallel arms interconnected by an elongated member, said parallel arms being supported by said first frame through said rolling elements; and, wherein said displacing means comprises dual translating units interconnecting said yoke and said first frame, one of said translating units being disposed in generally axial alignment with each arm of said yoke.

8. The tobacco harvester of claim 2 wherein said second frame further comprises a yoke having parallel arms interconnected by an elongated member, said parallel arms being supported by said first frame through rolling elements; and, wherein said lateral positioning means comprises dual translating units interconnecting said yoke and said first frame, one of said translating units being disposed in generally axial alignment with each arm of said yoke.

9. The tobacco harvester of claim 2 wherein said second frame further comprises vertical positioning means for selectively vertically positioning said defoliating means relative to said second frame to thereby selectively position said defoliating means relative to a selected vertical zone of the tobacco plants above the ground, said vertical positioning means including pivotable supporting means for pivotably supporting said panel members to thereby permit rotation of said panel members as a unit about a generally horizontal axis generally parallel to the direction of movement of said carrier in response to pressural contact between the tobacco plants and said guiding means.

10. A mechanical tobacco harvester comprising:

a laterally stationary carrier movable along a row of tobacco plants, said carrier including rigidly interconnected, laterally spaced first and second panel members each generally aligned with and facing an opposite side of the row of tobacco plants forming thereby an elongated, relatively narrow passage between the panel members to accommodate the passage of tobacco plants between said panel members as said carrier moves along the row;

dual flailing means, one disposed on each of said panel members, for flailing a selected vertical zone of the tobacco plants above ground to remove tobacco leaves growing from the portion of the stalks of tobacco plants within the selected vertical zone, said dual flailing means each comprising a disc fixed relative to said panel members and rotatable in a vertical plane intersecting a row of tobacco plants and a plurality of elongated flexible strands radiating outwardly from said disc, the strands of said dual flailing means being of sufficient length to overlap to some extent in rotational envelopes; and, conveying means carried by said carrier for catching and conveying laterally and vertically away from said flailing means tobacco leaves removed by said flailing means, said conveying means including:

a pair of elongated, horizontal, continuously rotatable shafts each disposed beneath the flailing means adjacent and parallel to opposite sides of the elongated passage; and, a plurality of parallel, elastomeric discs disposed on and axially spaced along each of said elongated shafts, said discs being dimensioned and disposed along said shafts to alternately mutually overlap to close said elongated passage.

11. The tobacco harvester claim 10 further comprising leaf deflecting means carried by said panel members immediately forward of said flailing means, said leaf deflecting means comprising:
- an arcuate, forwardly and downwardly extending lifting means for slipping beneath and lifting up tobacco leaves sagging in the path of said flailing means to expose to said failing means stems growing from the selected vertical zone of the tobacco plants to be defoliated while protecting the leaves from contact with said flailing means; and,
- planar deflecting means carried by said lifting means forwardly of said flailing means for deflecting leaves directly in the path of said flailing means to expose the stems thereof to said flailing means while protecting the leaves from contact by said flailing means as said carrier moves along the row of tobacco plants.

12. The tobacco harvester of claim 11 including:
- first vertical positioning means carried by said carrier and supporting said panel members for selectively vertically positioning said panel members relative to said carrier to thereby selectively position said defoliating means in a defoliating position relative to a selected vertical zone of the tobacco plants above the ground; and,
- second vertical positioning means for vertically positioning said flailing means and said leaf deflecting means as a unit relative to said panel members.

13. A mechanical tobacco harvester comprising:
- a carrier movable along one of a plurality of laterally spaced rows of tobacco plants, said carrier including a laterally stationary first frame in rolling contact with the ground and a second frame carried by said first frame; and,
- defoliating means carried by said second frame for at least partially defoliating successive tobacco plants in a row when said defoliating means is disposed in a defoliating position relative thereto and is moved therealong by said movable carrier,
- said second frame comprising:
    - a third frame having first and second laterally spaced panel members interconnected at an upper portion thereof and separated at the lowermost portion thereof to thereby form an elongated, relatively narrow passage of predetermined width extending between said panel members in a direction generally parallel to the direction of movement of said carrier,
    - guiding means carried by said third frame in position to engage the stalks of the tobacco plants for positioning said third frame relative to the tobacco plants by guiding the individual tobacco plants into and through the elongated passage in an essentially predetermined spatial relationship with said defoliating means as said carrier moves along the row, and
    - conveying means carried by said third frame laterally adjacent the elongated passage for collecting tobacco leaves removed from tobacco plants by said defoliating means and for conveying the collected leaves laterally and vertically away from said defoliating means,
- said second frame including vertical positioning means for selectively vertically positioning said defoliating means relative to said second frame to thereby selectively position said defoliating means relative to a selected vertical zone of the tobacco plants above the ground and pivotable supporting means for pivotably supporting said panel members to thereby permit rotation of said third frame as a unit about a generally horizontal axis generally parallel to the direction of movement of said carrier in response to pressural contact between the tobacco plants and said guiding means.

14. The tobacco harvester of claim 13 further comprising adjusting means carried by said panel members for selectively varying the width of the elongated passage between said panel members.

* * * * *